G. L. HUTCHINSON.
APPARATUS FOR UTILIZING WAVE FORCE.
APPLICATION FILED JULY 24, 1919.
1,366,002.
Patented Jan. 18, 1921.
2 SHEETS—SHEET 1.
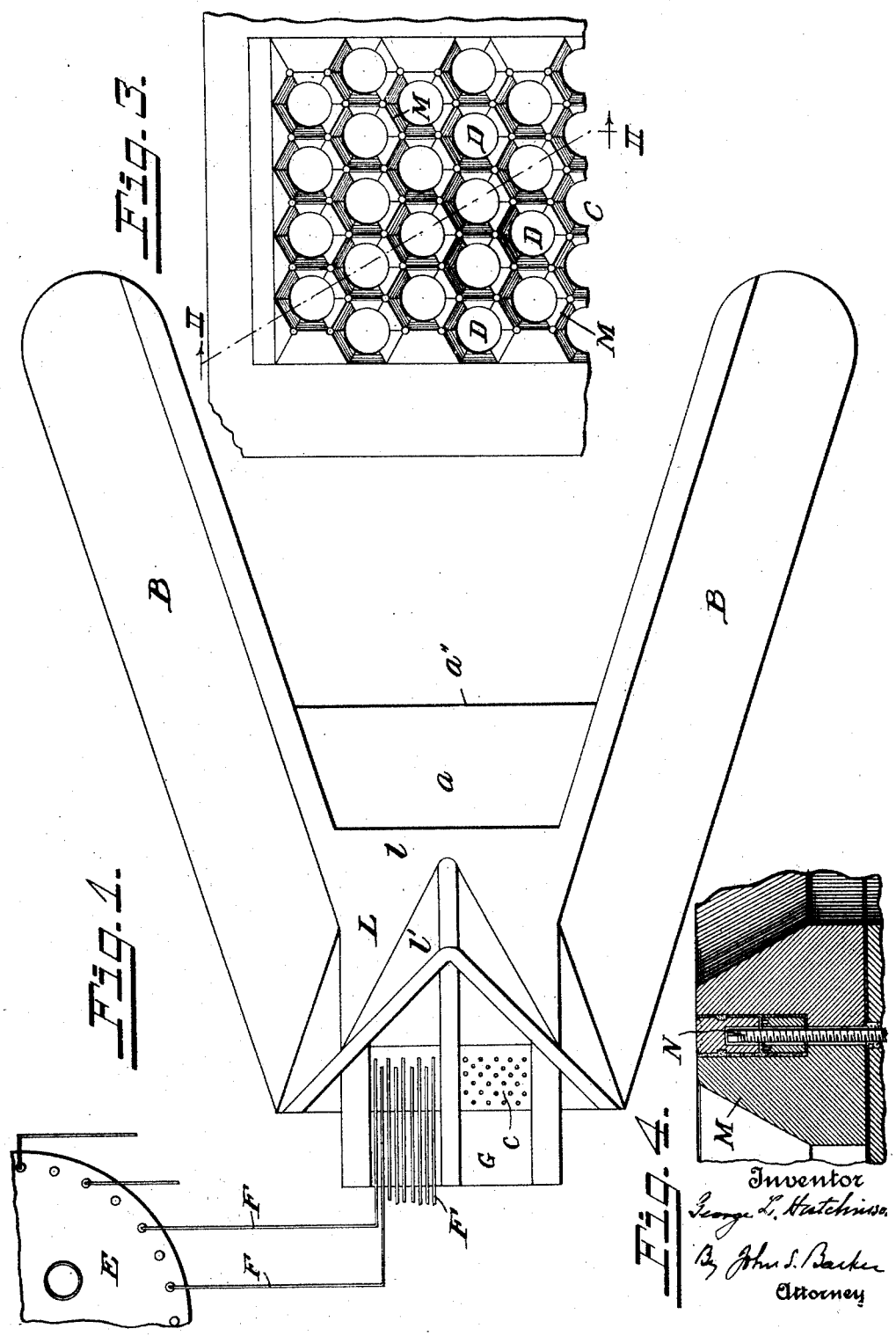

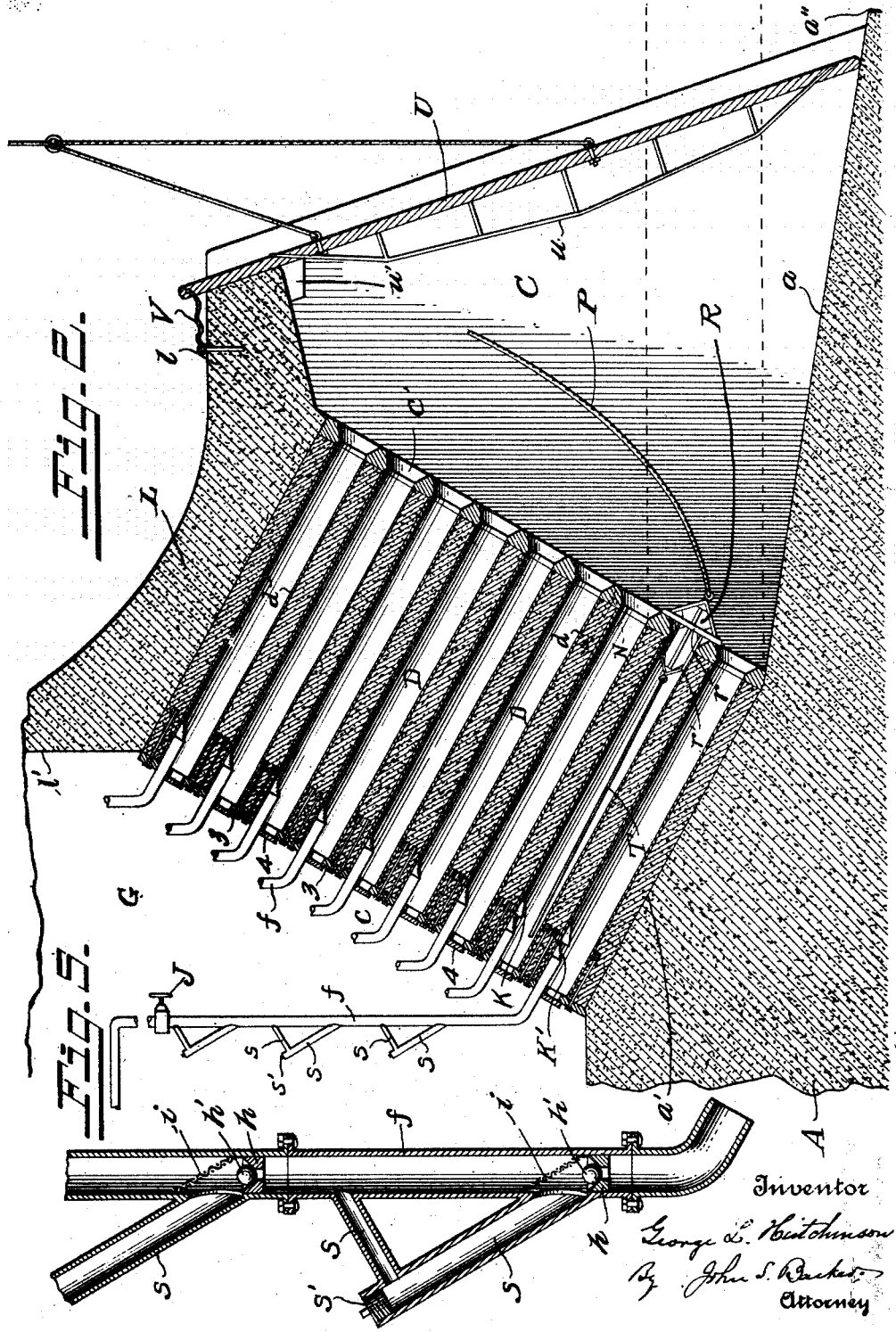

UNITED STATES PATENT OFFICE.

GEORGE L. HUTCHINSON, OF LOS ANGELES, CALIFORNIA.

APPARATUS FOR UTILIZING WAVE FORCE.

1,366,002.  Specification of Letters Patent.  Patented Jan. 18, 1921.

Application filed July 24, 1919. Serial No. 313,095.

*To all whom it may concern:*

Be it known that I, GEORGE L. HUTCHINSON, a citizen of the United States, residing at Los Angeles, in the county of Los Angeles and State of California, have invented certain new and useful Improvements in Apparatus for Utilizing Wave Force, of which the following is a specification.

This invention relates to apparatus for utilizing the force of the waves of the sea in accumulatng or storing power that may be utilized for industrial or other purposes, it being especially adapted to be used for compressing and storing air.

It is well known that the water of a wave, considered as a mass, does not have a forward or progressive movement where the depth of water is great, the motion being simply an oscillatory one. But as a wave approaches the land and reaches the place where the water becomes shallow there is a forward, or progressive movement of its upper part and this movement is greatest at about the time the wave breaks, this action taking place at approximately the place where the depth of the water below the surface equals the height of the wave. The water of the upper part of a breaking wave rushes forward toward the land, with great force when the waves are large, and flows back in a contrary direction below the surface, forming what is known as the undertow. I take advantage of the forces produced by the breaking of waves along the coast, utilizing such force in the manner I shall describe for the storage of energy, preferably by means of compressed air. The apparatus I employ should be located on a coast where the incoming waves are large and high, and should be situated at about the position where the waves usually break, that is where the forward incoming movements of the masses of water are the greatest. And, in order to increase the force of the waves, making them available for practical use even when the sea is not greatly agitated, I prefer to locate the apparatus at the narrow end of a wedge shaped or flaring channel facing the open sea, it being well known that the height, and hence effective force, of a wave is increased as its breadth is diminished.

In the accompanying drawings I have, for the purposes of illustrating my invention, shown an apparatus by means of which it may be carried into effect; but I do not wish to be limited to the exact construction and arrangement of parts therein delineated.

Figure 1 is a top plan view of an apparatus embodying my invention, no attempt therein being made to illustrate details of construction.

Fig. 2 is a longitudinal sectional view of the apparatus, the conduit for conveying away air compressed in the apparatus connected with but one of the compression chambers being shown, it being understood that such conduit is duplicated for each chamber, the section being taken along the broken line II—II of Fig. 3.

Fig. 3 is a front view of a section of the apparatus.

Fig. 4 is a detail longitudinal sectional view illustrating the means employed for securing in place the cap pieces that may be used at the open ends of the compression chambers.

Fig. 5 is a detail vertical sectional view, enlarged, of part of one of the conduits for the compressed air.

Having selected a suitable site for locating the apparatus I arrange a suitable foundation or base A, which may be of concrete, or of natural rock if the formation of the shore permits of the use of the latter. The apparatus should be located where the water is moderately deep off shore, say twenty or thirty feet in depth at a distance of two hundred feet or thereabouts from the shore line. The foundation A is constructed to have a sloping floor $a$ at a level below the low water line, extending out under the sea, and preferably terminating abruptly, as indicated at $a''$. Back of this floor the base or foundation is formed with a portion, $a'$, rising at a steeper angle than the floor and arranged to support the structure C containing the air compression chambers to be described. The foundaton A and the structure C are preferably located at the inner or narrow end of a channel formed either by the natural shore line or by a pair of diverging walls or piers B, B, of suitable height to cause the waves entering the channel to be directed toward the apparatus and at the same time to have their height and effectiveness increased. The air compression structure, designated as a whole by C, is supported upon the portion $a'$ of the foundation and between the inner parts of the walls B, B. It may be of reinforced monolithic concrete construction, or formed of molded blocks or sections of reinforced concrete suitably laid and tied together. It is constructed so as to inclose a plurality of air compression chambers, D, preferably of cylindrical shape and relatively long, and extending from end to end of the structure, the chambers being open toward the sea at their outer ends, and at their rear ends closed, by plates, stoppers, blocks or other suitable closures, 3, secured over the ends of the chambers in any suitable manner.

The structure C may be of any suitable size and shape and contain many or few air chambers D. These latter are preferably about two feet in diameter and should be twenty or more feet in length, and the amount of material surrounding each chamber and separating one from another should be sufficient to give the necessary strength to resist the pressures produced within the chambers under any circumstances during the use of the apparatus. As has been stated the structure C is built upon the inclined upper surface of the part $a'$ of the bed or foundation, and the air chambers are parallel with each other and preferably also with the face of the portion $a'$ of the foundation, thus inclining downwardly toward their open ends so as readily to drain toward the sea. The front wall $c'$ of the structure inclines forwardly, that is overhangs somewhat, and the rear wall $c$ is preferably parallel therewith.

E indicates a reservoir or tank, suitably located on shore, for receiving and storing the compressed air from the chambers D, it being connected with the latter by a series of pipes or conduits F, one leading to each chamber D. Each pipe or conduit F connects with its respective air chamber through a closing plate 3, and is preferably provided with a vertical portion $f$, the vertical portions of the several pipes being preferably located in a closed chamber or apartment G situated in rear of the structure C. Each vertical pipe $f$ is provided with one or more valve seats $h$, preferably at least two; and the valves $h'$, associated therewith, are arranged to prevent the back flow of air toward the compression chamber, though allowing it to move freely toward the reservoir E. The valves $h'$ are preferably made hollow or constructed of some material that will float so that if any water be forced from the chambers D into the pipe sections $f$, as would likely occur when the force of the waves is great, the valves will rise with the incoming water and be held thereby from their seats until it drains back into the air chambers, as the wave recedes. At a suitable distance above each valve there is arranged a screen $i$, or other means for preventing the valve from rising too high. Each screen is preferably inclined, as represented in Fig. 5, and at its upper end joins the wall of the pipe $f$ near the lower open end of a short inclined tube S, the upper end of which is connected with the pipe $f$ by an open tube $s$. The upper end of the tube section S is closed by a removable plug $s'$, permitting access to the valve and its seat.

J indicates a cut-off valve by means of which the conduit F may be closed from communication with the chamber D whenever desired.

In order to prevent sea-weed, floating material of any nature, sand and gravel, from being forced into the pipes F, I preferably arrange a deflecting plate K opposite the end of each pipe. This deflector may be formed of a piece of vitrified clay or stone suitably anchored or held in place and shaped to have its front face inclined as represented in the drawings. Other means may be employed in place of or supplemental to the deflector K if found necessary or desirable to prevent the entrance of objectionable materials into the air pipes F such as a screen $K'$. The walls or faces of the chambers D may, if found desirable, be lined with suitable material, $d$, to prevent erosion. Each plate 3 closing the rear or inner end of a compression chamber is preferably formed with a hand hole for permitting access to the chamber whenever desired. This hole is normally kept closed by a cover 4.

The forward inclination of the rear wall of the structure C facilitates the arrangement of the pipes F, permitting easy access to each and all of them, as well as to each and all of the air chambers D, from the working room or chamber G.

The structure C may be covered by a wall, plate or slab L, of reinforced concrete, extending from side wall B to side wall B, and formed with a forward projecting or overhanging portion $l$, located forward of and above the front wall $c'$ through which are the open ends of the chambers D, and having its under surface inclining from the front backward and downward toward the front wall $c'$. This overhanging part of the top wall or roof of the structure C thus serves to deflect toward the air chambers the upper parts of such waves as are so high that they otherwise would pass over the structure. The cover or roof L may extend upward toward the rear to form a vertical wall $l'$ that serves to protect the work room G, the pipes F, and other apparatus at the rear of the structure C, from the force of heavy waves which may dash in and break over the structure. This wall $l'$ is preferably of V-shape, as indicated in Fig. 1, with its apex toward the front and located well forward over the structure C, and with its divergent legs preferably extending laterally beyond the structure, thus constituting means for anchoring it to the side walls B or to the bed rock or base A, and at the same time breaking the waves, dividing and deflecting them laterally.

As the front face or wall $c'$ is exposed to the full force of the waves, I find it desirable to protect it from erosion and injury. I have therefore provided removable protecting cap plates or pieces, M, formed of vitrified clay, metal, or other material adapted to withstand the action of the waves. These protecting caps are secured to the wall face by anchor rods N set into the material of the structure C.

It sometimes becomes necessary in apparatus of this character to shut down for repairs or other purposes, and I have provided means for closing any one or more of the compression chambers individually, and for closing them all simultaneously, as may be desired.

Referring to Fig. 2, R indicates a plug or closure of suitable construction arranged to close the open end of a chamber D. It is secured to the end of a chain P by means of which it may be lowered to place from the projecting upper ledge $l$ of the structure and by which it may be withdrawn after use. It is formed with a face plate $r$, adapted to bear against the face $c'$ of the wall surrounding an air chamber and with a frame $r'$, adapted to enter the chamber and constitute the means for the attachment of a rope or chain T by which the plug is held in place, this rope or chain being let down through the chamber D from the inner end, being passed through the hand hole in the closure 3.

I prefer that the plug or closure R should be so constructed that it will float upon the water.

When the entire apparatus is to be shut down I employ a gate U adapted to cover the entire face of the structure C, as represented in Fig. 2. It extends practically from wall B to wall B, its lower end being adapted to rest upon the flooring $a$ of the foundation or base, and its upper end extending up to or above the overhanging portion $l$ of the top or roof of the structure C, to which the gate is hinged or connected as by a chain V or other means. The gate is suitably braced by truss rods $u$ and it is provided with a series of lugs or projections $u'$ adapted to lie under the edge of the overhanging ledge $l$. This closing gate is raised and lowered by means of suitable tackle, of which only the lower connecting members, W, are represented.

The operation of the apparatus may now be stated.

The waves coming in from the open sea enter the space or channel between the walls or piers B and are confined and directed forward toward the apparatus situated at the head of the channel, the height of the waves being increased as they approach the front face of the structure C, by reason of the converging nature of the channel. The structure C is so placed that the waves reach its exposed face at the time they are exerting their greatest effective force, that is, about the time they begin to break. The advancing mass of water meeting the face of the structure C enters the chambers D therein, confining or trapping a body of air in each, which is compressed and driven forward by the water, which acts as liquid pistons within the chambers. The air thus compressed seeks exit through the pipes F and passes into the reservoir E, where it is confined by the valves $h'$, and from which it may be taken for any practical use. If the force of a wave be sufficient to carry the water thereof beyond the inner end of any chamber and into the vertical portion of a conduit F, the water, on flowing past the valve seat $h$, will come into engagement with a valve $h'$ which has been deflected into the short tube S and hold it up and away from the valve seat, since, as already stated, the valve is lighter than water, until the water recedes, whereupon it instantly seats and traps the air following the receding water.

As the valve chambers D are disposed at various levels it may be that those of the lowest level only are used at low water or when the incoming waves are not high, while all of them may be in use when a very high sea is running. A number of advantages are incident to the arrangement of the air chambers and the construction of the structure C, as described and illustrated. The overhanging face or wall $c'$, especially when supplemented with the projecting curtain or lip 1, confines and directs the water into the air chambers, insuring that a larger portion thereof shall be utilized for air-compressing purposes than if the wall were perpendicular or inclined backwardly. Again, the downward inclination of the air chambers toward the front insures that they shall readily drain themselves, and that any solid substance like gravel or pieces of drift which might injure the apparatus, shall readily pass back with the receding waters instead of lodging in the apparatus. I prefer that the front edge of the flooring $a$ should drop off suddenly two or three feet in order to catch and retain any sand and gravel that may be washed up on the flooring and toward the apparatus.

The apparatus described is exceedingly simple in construction, there being but few parts that could possibly get out of order and once being set up and arranged for operation is practically automatic in its working. The chamber or work room G is well sheltered by the structure C and the protecting wall $b'$.

It will be understood that no attempt is made in the accompanying drawings to show exact relative proportions. Thus the floor designated a may be, and ordinarily would be, many times greater in length than the length of the structure C in which are formed the air chambers; but the limitations of space on the drawing make it necessary to show them somewhat out of relative proportion. So, too, the proportions of the other parts may be varied from that shown. Indeed no two structures will probably be alike in size and relative proportions, because each will necessarily be especially designed to suit conditions of the shore on which it is constructed.

What I claim is:

1. In an apparatus for utilizing the force of the waves of the sea, a structure containing air compression chambers having a face against which the waves break and in which are the openings to the said air chambers, the face of the structure overhanging or inclining toward the front.

2. In an apparatus for utilizing the force of the waves of the sea, a structure in which are formed air compression chambers, having a face against which the waves dash or break inclined forward, and the roof of the structure having a lip or flange projecting beyond the said face and having its lower surface inclined downward whereby it directs the waves which may break against it toward the openings to the air chambers.

3. In an apparatus for utilizing the force of the waves of the sea, a pair of piers converging shoreward, and a structure at the head of the channel between the piers, in which are formed air compression chambers, and having a face against which the waves break, the said face inclining forward and having formed therein the openings to the air chambers, 4. In an apparatus for utilizing the force of the waves of the sea, a pair of piers extending into the sea, and a structure at the head of the channel between the piers having a face against which the waves break inclined so that its upper portion overhangs the lower part thereof, there being formed in the structure a series of air compression chambers having openings through the front face of the structure through which the water of the waves is free to pass, the chambers inclining downward toward the sea.

5. In an apparatus for utilizing the force of the waves of the sea, a structure containing a series of chambers at different levels, and having a front face against which the waves break and in which are the openings to the chambers, and a rear wall or face inclining forward, and pipes connecting with the said chambers at the said rear wall.

6. In an apparatus for utilizing the force of the waves of the sea, a structure in which are formed a series of chambers at different levels, having a face against which the waves break and in which are openings to the chambers, and having also a rear forwardly inclined wall or face through which are openings to the chambers, covers or closures for the rear ends of the chambers, pipes connecting with the chambers through the said closures, and a work room or compartment in rear of the structure, in which are situated the said pipes.

7. In an apparatus for utilizing the force of the waves of the sea, a base having a floor portion extending under the sea and a foundation portion in rear of the said floor and inclined toward the sea at a greater angle than the floor, a structure built above the said foundation portion containing a series of air compression chambers inclining downward toward the sea and having a front wall against which the waves of the sea break inclined forward.

8. In an apparatus for utilizing the force of the waves of the sea, a structure facing the sea and against which the waves break, having formed through it a series of longitudinal air chambers open at their front ends, toward the sea, and closed at their rear ends by removable closures, and conduits connected with the closures through which the contents of the said chambers may be conducted away as such contents are moved by the force of the waves.

9. In an apparatus for utilizing the force of the waves of the sea, a base or foundation inclined toward the sea, and a structure built thereon containing air chambers having front and rear faces substantially parallel and forwardly inclined, the front wall facing the sea and having openings to the air chambers, and pipes for leading off the compressed air connecting respectively with the said chambers at the rear wall or face of the structure.

10. In an apparatus for utilizing the force of the waves of the sea, an air compression chamber having an opening through which the water of the waves is adapted to enter, a closure for the opposite end of the chamber, a pipe for leading off the air compressed in the chamber connected therewith through the upper portion of the closure, the closure being provided with a hand opening below the said pipe connection, a cover for the hand opening, and means for preventing the entrance of foreign substances into the pipe.

11. In an apparatus for utilizing the force of the waves of the sea, an air compression chamber into which the water of the waves is adapted to enter, a pipe for leading off the air compressed in the chamber having an upright portion, and a check valve in the pipe for preventing the back flow of air, the valve being arranged to float in water whereby it will permit drainage of the pipe.

12. In apparatus for utilizing the force of the waves of the sea, an air compression chamber into which the water of the waves may enter, a pipe for leading off the air compressed in the chamber having an upright portion, a check valve in the pipe for preventing back flow of air, a lateral pipe opening into the said lead-off pipe near the valve and means for directing the valve into the lateral pipe, to permit free flow through the lead-off pipe.

13. In apparatus for utilizing the force of the waves of the sea, an air compression chamber into which the water of the waves enters, a pipe for leading off the air compressed in the chamber having an upright portion, a lateral pipe leading from an opening into the lead-off pipe at an upwardly inclined angle, a check valve in the pipe for preventing back flow of air the valve being arranged to float in water, and a screening means for directing the valve as it is raised from its seat into the inclined lateral pipe, while permitting air and water to freely pass through the lead-off pipe, the valve being held from its seat until the water drains from the pipe.

14. In an apparatus for utilizing the force of the waves of the sea, a structure in which is formed an air compression chamber that is open at its front end, a closure for the rear end of the chamber formed with a hand opening through it, removable means for closing the hand opening, and pipe connections for leading off the air compressed in the chamber.

15. The combination of a compression chamber open to the waves of the sea at its outer end, a storage reservoir, pipe connections between the reservoir and the compression chamber, and a float valve in the said connections for controlling the movements of the air and water through the said connections.

16. The combination of a compression chamber open to the waves of the sea at its outer end, a reservoir, connections between the reservoir and the compression chamber, and a stopper for closing the open outer end of the chamber.

17. The combination of a compression chamber open to the waves of the seat at its outer end, a reservoir, connections between the reservoir and the compression chamber, a stopper for closing the open end of the chamber, and means extending through the compression chamber from the rear for holding the stopper in place.

18. A structure in which are formed a plurality of compression chambers open to the waves of the sea at their forward ends, a reservoir, connections between the reservoir and the compression chambers, and a removable stopper arranged to close the open end of any one of the chambers, and means for holding the stopper in closed position.

19. In an apparatus for utilizing the force of the waves of the sea, a structure in which are formed a series of compression chambers which are open through the front face of the structure to the waves, a reservoir, conducting means between the reservoir and the chambers, and a removable gate arranged to cut off from the action of the waves all of the said compression chambers.

20. In an apparatus for utilizing the force of the waves of the sea, a structure in which are formed a plurality of compression chambers which are open to the waves through the front wall thereof, and removable means for protecting the structure from the force of the waves secured to the front face thereof.

21. In an apparatus for utilizing the force of the waves of the sea, a structure containing a series of compression chambers, a reservoir, connections between the compression chambers and the reservoir, and removable caps secured to the outer face or wall of the structure for protecting it against the force of the waves.

22. In an apparatus for utilizing the force of the waves of the sea, a structure in which are formed a series of air compression chambers, a work room or chamber in rear of the said structure, and a wave deflecting wall for protecting the said work room or chamber arranged above the said structure.

23. In an apparatus for utilizing the force of the waves of the sea, a structure in which are formed a series of individual air compression chambers open at the front to admit the water of the sea waves, and closed at the rear, a series of individual conduits connected respectively with the said chambers at their rear ends for conducting away the air compressed in the said chambers, individual valves for checking back flow of air through the said pipes, and a common collecting reservoir in which the air is delivered through the said pipes, the pipes being individually accessible for purposes of inspection and repair.

GEORGE L. HUTCHINSON.